(12) United States Patent
Arkko et al.

(10) Patent No.: US 11,689,358 B2
(45) Date of Patent: Jun. 27, 2023

(54) METHODS PROVIDING TRANSMISSION AND/OR SEARCHING OF ENCRYPTED DATA AND RELATED DEVICES

(71) Applicant: Telefonaktiebolaget LM Ericsson (publ), Stockholm (SE)

(72) Inventors: Jari Arkko, Kauniainen (FI); Ari Keränen, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 366 days.

(21) Appl. No.: 16/772,863

(22) PCT Filed: Dec. 29, 2017

(86) PCT No.: PCT/EP2017/084816
§ 371 (c)(1),
(2) Date: Jun. 15, 2020

(87) PCT Pub. No.: WO2019/129358
PCT Pub. Date: Jul. 4, 2019

(65) Prior Publication Data
US 2021/0167950 A1 Jun. 3, 2021

(51) Int. Cl.
*H04L 9/08* (2006.01)
*H04L 29/06* (2006.01)
*H04L 9/32* (2006.01)

(52) U.S. Cl.
CPC ............ *H04L 9/0825* (2013.01); *H04L 9/085* (2013.01); *H04L 9/0822* (2013.01); *H04L 9/3297* (2013.01)

(58) Field of Classification Search
CPC ...... H04L 9/0825; H04L 9/0822; H04L 9/085; H04L 9/3297; H04L 63/0442
See application file for complete search history.

(56) References Cited

U.S. PATENT DOCUMENTS

| 11,095,620 | B1 * | 8/2021 | Sirota | H04L 63/062 |
| 2008/0260151 | A1 * | 10/2008 | Fluhrer | H04L 63/04 380/255 |

OTHER PUBLICATIONS

International Search Report and Written Opinion of the International Searching Authority for International Application No. PCT/EP2017/084816, dated Jul. 12, 2018.

(Continued)

*Primary Examiner* — Izunna Okeke
(74) *Attorney, Agent, or Firm* — Sage Patent Group

(57) ABSTRACT

Methods may be provided to transmit encrypted data from a communication device to a remote storage system. A data value and information related to the data value may be provided, where the information related to the data value includes an identifier associated with the communication device and a time-value associated with the data value. A combination of the time-value and the identifier may be encrypted using a public key to provide a first encrypted value. The data value may be encrypted using the public key to provide a second encrypted value, and a hidden datum package may be generated including the time-value, the first encrypted value, and the second encrypted value. The hidden datum package including the time-value, the first encrypted value, and the second encrypted value may be transmitted to the remote storage system.

20 Claims, 9 Drawing Sheets

(56) References Cited

OTHER PUBLICATIONS

Hossein Shafagh et al., "Talos: Encrypted Query Processing for the Internet of Things," Embedded Networked Sensor Systems, ACM, Nov. 1, 2015, pp. 197-210.
Hui Zhu et al., "Secure and Privacy-Preserving Body Sensor Data Collection and Query Scheme," Sensors, vol. 16, No. 2, Feb. 1, 2016, pp. 1-16.
Dongxi Liu et al., "Programmable Order-Preserving Secure Index for Encrypted Database Query," 2012 IEEE 5th International Conference on Cloud Computing, Jun. 24, 2012, pp. 502-509.
Raphael Bost, "Sophos—Forward Secure Searchable Encryption," Computer and Communications Security, ACM, Oct. 24, 2016, pp. 1143-1154.
Wikipedia, "Homomorphic encryption," https://en.wikipedia.org/wiki/Homomorphic_encryption, last edited May 27, 2020, pp. 1-9.
Wikipedia, "Attribute-based encryption," https://en.wikipedia.org/wiki/Attribute-based_encryption, last edited May 30, 2020, pp. 1-4.
Cryptography Stack Exchange,"What is Attribute Based Encryption?" https://crypto.stackexchange.com/questions/17893/what-is-attribute-based-encryption, question asked Jun. 24, 2014, pp. 1-3.
Amit Sahai et al., "Fuzzy Identity-Based Encryption," In: Cramer R. (eds) Advances in Cryptology—EUROCRYPT 2005. EUROCRYPT 2005. Lecture Notes in Computer Science, vol. 3494. Springer, pp. 457-473.

* cited by examiner

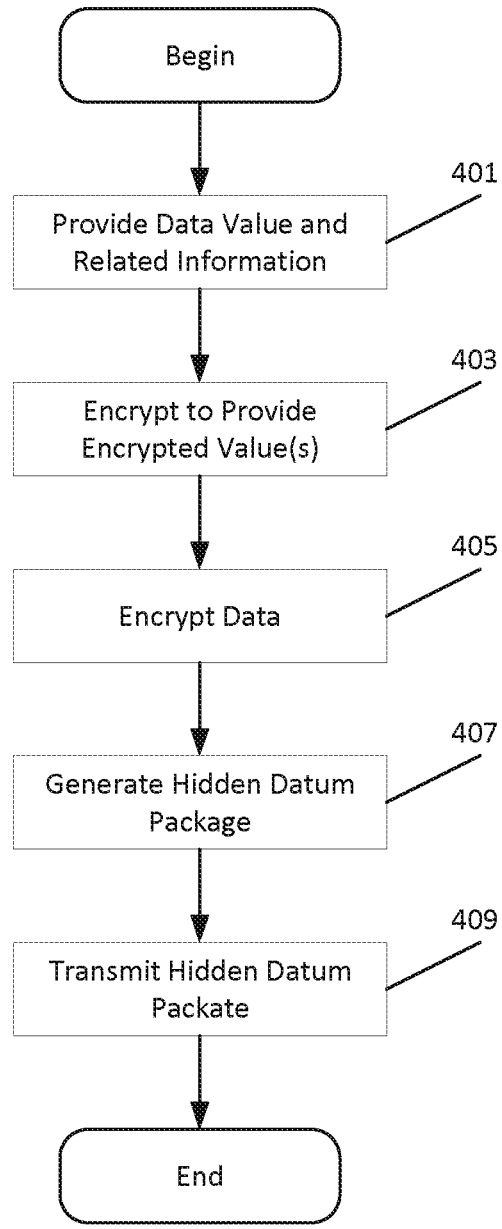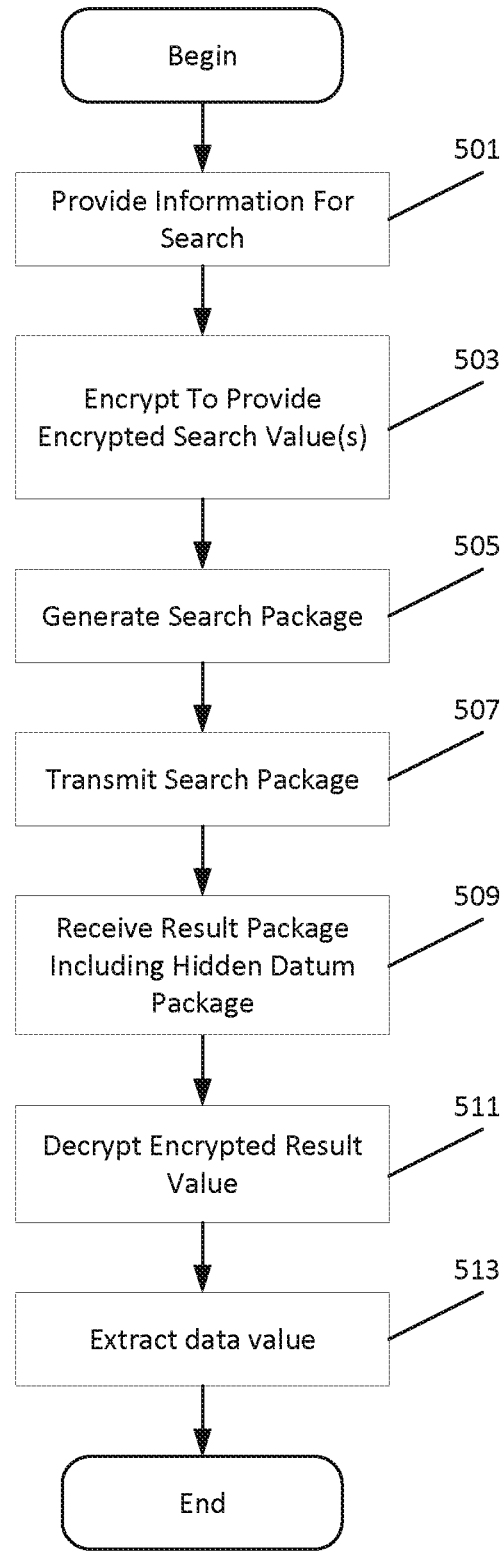

METHODS PROVIDING TRANSMISSION AND/OR SEARCHING OF ENCRYPTED DATA AND RELATED DEVICES

CROSS REFERENCE TO RELATED APPLICATION

This application is a 35 U.S.C. § 371 national stage application of PCT International Application No. PCT/EP2017/084816 filed on Dec. 29, 2017, the disclosure and content of which is incorporated by reference herein in its entirety.

TECHNICAL FIELD

The present disclosure relates generally to data storage, and more particular to methods providing storage for encrypted data.

BACKGROUND

Many if not most systems today on the Internet may rely on cloud services for storage of data. Internet of Things (IOT) applications and devices may do so as well.

Cloud storage, and cloud applications may be very convenient. They may be extremely scalable, cost efficient, always available, and/or easily managed. For many IOT applications, there may be little/no practical alternative, given the intermittent connectivity and low power requirements of the devices themselves. Data may be stored in a globally accessible manner so that user interfaces, algorithmic applications, and so on have access to the data whenever needed.

However, there may be some concerns, such as the ability to keep a user's data confidential. One issue relating to such concerns may relate to whether a user wishes to share his or her data with another entity at all, as those entities may want to monetize or use the user's data in some fashion. As many cloud-based systems are deployed by entities other than the user or application owner, this can be a concern. Another issue may relate to owners of applications (e.g., in health care) having legal obligations to hold data in their own storage. In such cases, a private cloud implementation may be the right answer.

Another issue may be that of accidental leaks of data from an otherwise well-meaning cloud provider. Many publicized events involving such leaks have occurred.

An issue with storing potentially privacy-sensitive data about IOT systems in cloud storage is that if the data is stored in cleartext, the potential for undesirable use and leaks may increase.

A common method to implement IOT systems may involve protecting data while in transit, but not necessarily while stored in the cloud. Popular IOT protocols may allow this to be done easily: using HTTP with TLS, or CoAP with DTLS, for example. There may be less choice about encryption methods to protect data objects, for example, even across proxy hops, let alone protecting data at rest. Data may thus be vulnerable to leaks while stored in the cloud.

SUMMARY

According to some embodiments of inventive concepts, a method may provide transmission of encrypted data from a communication device to a remote storage system. A data value and information related to the data value may be provided, with the information related to the data value including an identifier associated with the communication device and a time-value associated with the data value. A combination of the time-value and the identifier may be encrypted using a public key to provide a first encrypted value. The data value may be encrypted using the public key to provide a second encrypted value. A hidden datum package may be generated including the time-value, the first encrypted value, and the second encrypted value. The hidden datum package including the time-value, the first encrypted value, and the second encrypted value may be transmitted to the remote storage system.

According to some other embodiments of inventive concepts, a method may provide searching of encrypted data on a remote storage system, with the encrypted data being associated with a remote communication device. Information to be used for the search may be provided where the information to be used for the search includes a time-value and an identifier associated with the remote communication device. A combination of the time-value and the identifier may be encrypted using a public key associated with the remote communication device to provide an encrypted search value. A search package including the time-value and the encrypted search value may be generated, and the search package including the time-value without encryption and the encrypted search value may be transmitted to the remote storage system. A result package including a hidden datum package including the time-value, the encrypted search value, and an encrypted result value may be received from the remote storage system. The encrypted result value may be decrypted using a secret key associated with the public key to provide a data value, and the data value may be extracted.

According to some embodiments of inventive concepts, a communication device (such as an IOT device) may transmit encrypted data in to a remote storage system in a format to facilitate searching without compromising security. The remote storage system can thus store the encrypted data to facilitate searching without being aware of the actual data or any of the public or secret keys used to encrypt or decrypt the data. Another communication device (such as a user's computer, smartphone, etc.) running an IOT application may thus be able to generate encrypted search terms used to search data at the remote storage system and receive encrypted results of such searching. Remote storage/searching/retrieval of data may thus be provided while maintaining the data in an encrypted format at the remote storage system thereby reducing a risk of unintended access.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 4 is a flow chart illustrating operations of the communication device of FIG. 2 according to some embodiments of inventive concepts;

FIG. 5 is a flow chart illustrating operations of the communication device of FIG. 3 according to some embodiments of inventive concepts;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

Figure 2:
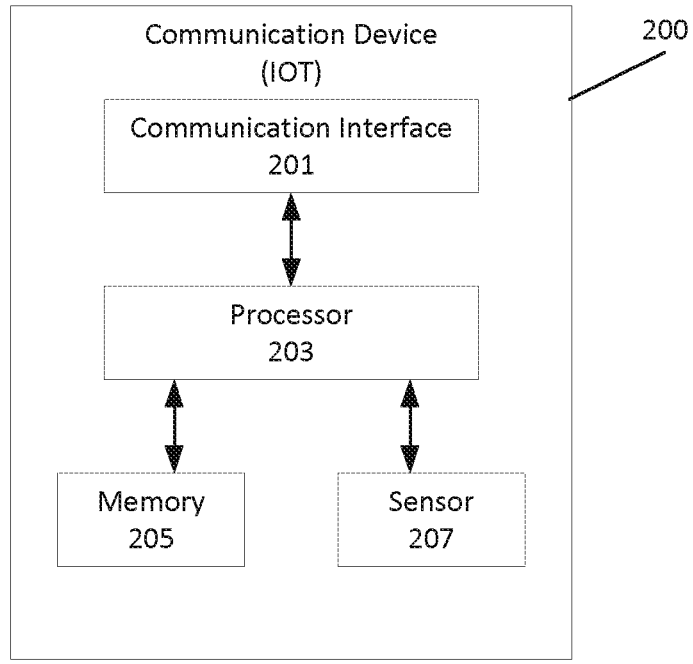
FIG. 2 is a block diagram illustrating a communication device providing encrypted data according to some embodiments of inventive concepts.

FIG. 2 is a block diagram illustrating an IOT communication device 200 (which may be a wireless device, a 3GPP user equipment or UE device, etc.) according to some embodiments disclosed herein. As shown, communication device 200 may include processor 203 coupled with communication interface 201, memory 205, and sensor 207. Communication interface 201 may include one or more of a wired network interface (e.g., an Ethernet interface), a WiFi interface, a cellular radio access network (RAN) interface (also referred to as a RAN transceiver), and/or other wired/wireless network communication interfaces. Communication device 200 can thus provide wired/wireless communication over one or more wire/radio links with a remote storage system (e.g., a cloud based storage system). Processor 203 (also referred to as a processor circuit or processing circuitry) may include one or more data processing circuits, such as a general purpose and/or special purpose processor (e.g., microprocessor and/or digital signal processor). Processor 203 may be configured to execute computer program instructions from functional modules in memory 207 (also referred to as a memory circuit or memory circuitry), described below as a computer readable medium, to perform some or all of the operations and methods that are described herein for one or more of the embodiments. Moreover, processor 203 may be defined to include memory so that separate memory 207 may not be required. IOT communication device 200, processor 203, and transceiver 201 may thus perform operations, for example, discussed below with respect to the figures.

Sensor 207 may thus be used to generate measurements (e.g., temperature, pressure, etc.) that are transmitted by processor 203 through communication interface 201 to a remote storage system. While sensor 207 is shown within IOT communication device 200, sensor 207 may be provided outside device 200. Moreover, while measurements are discussed by way of example, any data values may be transmitted by processor 203 through communication interface 201 to a remote storage system according to some embodiments of inventive concepts.

Figure 3:
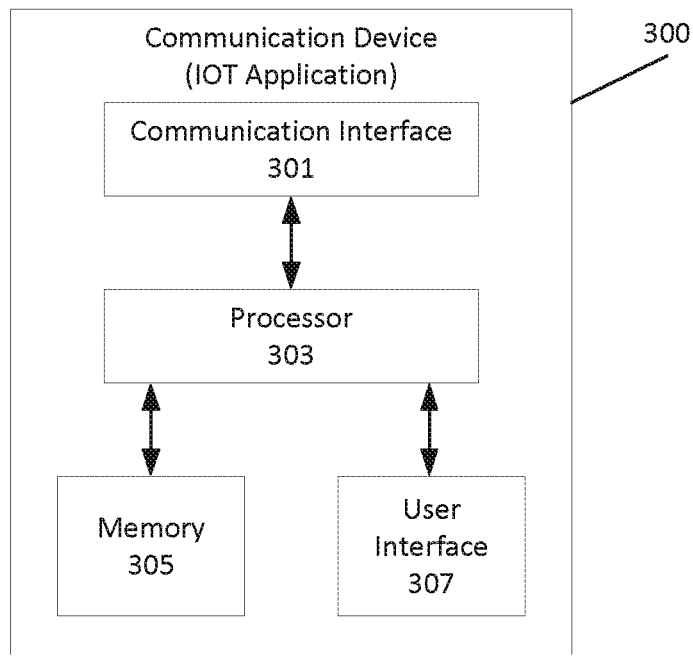
FIG. 3 is a block diagram illustrating a communication device providing searching of encrypted data according to some embodiments of inventive concepts.

FIG. 3 is a block diagram illustrating an IOT application communication device 300 (which may be a wireless device, a smartphone, a computer (desktop, laptop, netbook, etc.), a 3GPP user equipment UE device, etc.) according to some embodiments disclosed herein. As shown, IOT application device 300 may include processor 303 coupled with communication interface 301, memory 305, and user interface 307. Communication interface 301 may include one or more of a wired network interface (e.g., an Ethernet interface), a WiFi interface, a cellular radio access network (RAN) interface (also referred to as a RAN transceiver), and/or other wired/wireless network communication interfaces. IOT application device 300 can thus provide wired/wireless communication over one or more wire/radio links with a remote storage system (e.g., a cloud based storage system). Processor 303 (also referred to as a processor circuit or processing circuitry) may include one or more data processing circuits, such as a general purpose and/or special purpose processor (e.g., microprocessor and/or digital signal processor). Processor 303 may be configured to execute computer program instructions from functional modules in memory 307 (also referred to as a memory circuit or memory circuitry), described below as a computer readable medium, to perform some or all of the operations and methods that are described herein for one or more of the embodiments. Moreover, processor 303 may be defined to include memory so that separate memory 307 may not be required. IOT application communication device 300, processor 303, and communication interface 301 may thus perform operations, for example, discussed below with respect to the figures.

As discussed below, search information may be generated by processor 303 responsive to user input accepted through user interface 307. User interface 307, for example, may include a keypad, a touch sensitive display, or other input device configured to accept user input of alpha-numeric information and/or other information used to generate search information. User interface 307 may also include a display configured to provide visual output of a data value(s) received/decrypted/extracted as a result of a search.

As disclosed herein, a communication device 200/300 may be any device that has an addressable interface (e.g., an Internet protocol (IP) address, a Bluetooth identifier (ID), a near-field communication (NFC) ID, etc.) and/or is intended for accessing services via an access network and configured to communicate over the access network via the addressable interface. For instance, the communication device 200/300 may be, but is not limited to: mobile phone, smart phone, sensor device, meter, vehicle, household appliance, medical appliance, media player, camera, or any type of consumer electronic device, for instance, but not limited to, television, radio, lighting arrangement, tablet computer, laptop, or PC. As further examples, the communication device 200/300 may be implemented in industrial applications such as jet engines, oil and gas equipment, power grids, locomotives, smart factories, industrial analytics, robotics, augmented reality, 3D printing, connected supply chains, etc. The communication device 200/300 may be a portable, pocket-storable, hand-held, computer-comprised, or vehicle-mounted mobile device, enabled to communicate voice and/or data, via a wireless or wireline connection. A communication device 200/300 may have functionality for performing monitoring, controlling, measuring, recording, etc., that can be embedded in and/or controlled/monitored by a central processing unit (CPU), microprocessor, ASIC, or the like, and configured for connection to a network such as a local ad-hoc network or the Internet. The communication device 200/300 may be, but not limited to, an Internet of Things (IoT) device, a Cellular IoT (CIoT), a Machine-Type Communications (MTC) device, Machine-to-Machine (M2M) device. A communication device 200/300 may have a passive communication interface, such as a quick response (Q) code, a radio-frequency identification (RFID) tag, an NFC tag, or the like, or an active communication interface, such as a modem, a transceiver, a transmitter-receiver, or the like.

Protecting data at rest (i.e., while stored in a remote storage system such as a cloud based storage system) may be difficult if one wants to protect data at rest and also provide some useful functionality from a cloud system. Some tools from the research community may enable work on encrypted data, but these tools may have limited applicability. Such encryption tools may include:

Homomorphic encryption is discussed, for example, in "Homomorphic Encryption," Wikipedia, https:// en.wikipedia.org/wiki/Homomorphic_encryption, last edited 1 Dec. 2017 (also referred to as reference [1]). Homomorphic encryption may allow operations on encrypted data, so that the result of an operation on an encrypted data item is the same as the result of the same operation on cleartext data, with the result encrypted. However, only limited operations may enable this mode of operation.

Attribute-based encryption is discussed, for example, in "Attribute-based Encryption," Wikipedia, https:// en.wikipedia.org/wiki/Attribute-based_encryption, last edited 22 Nov. 2017 (also referred to as reference [2]), and in "What is Attribute Based Encryption," Cryptography, https://crypto.stackexchange.com/questions/17893/what-is-attribute-based-encryption, edited 30 Jan. 2015 (also referred to as reference [3]). Attribute based encryption is a variant of Identity-based encryption. It allows specific users to decrypt data only if they possess exactly those attributes. However, like all identity-based encryption mechanisms, attribute-based encryption assumes the existence of a central authority that assigns keys to users. This may be incompatible with a desire to reduce reliance on and/or avoid a central entity, and to allow individual users or applications to encrypt data without having to trust any central entity that would ultimately have access to all data.

According to some embodiments of inventive concepts, a cloud-based remote storage system may have the ability to:
Store data (e.g., from sensors) received from IOT devices; and/or
Perform (limited) searches on the data (e.g., for data coming out of an IOT device sensor).

In such embodiments, the cloud based storage system may be unable to identify individual applications or users, at least not at the level of the data storage and/or search functions.

Figure 1:
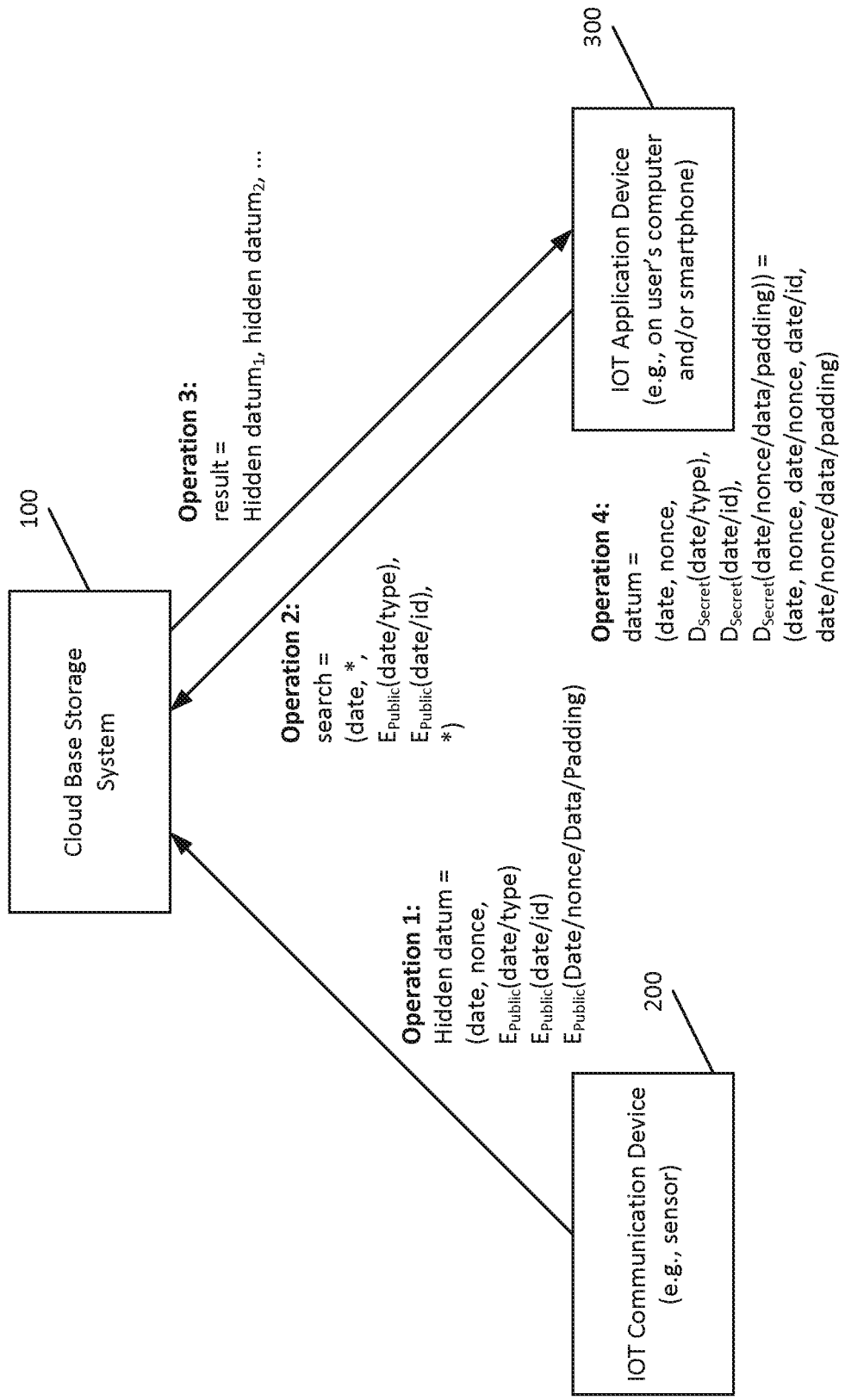
FIG. 1 is a block diagram illustrating operations of storing, searching, and receiving encrypted data according to some embodiments of inventive concepts.

FIG. 1 is a block diagram illustrating a flow of generating encrypted data, storing the encrypted data, searching for items of the encrypted data, and using the data according to some embodiments of inventive concepts. As shown in FIG. 1:

Operation 0a. Each IOT communication device 200 (e.g., remote IOT communication device) may have a key pair (Public, Secret) associated with it. The owner or user of the IOT communication device 200 may need to know the Public key, as the owner of the IOT communication device 200 is the owner of data generated by the IOT communication device 200 that is stored in the cloud based storage system 100. The key pair could be given to an IOT communication device 200 by the user, or generated. This can be accomplished by the user remembering the generated key, or for instance, having the key printed on the physical IOT communication device 200 when manufactured or provided within its packaging materials when sold.

Operation 0b. All data may be represented as:
datum=(date, type, id, data)
where date may indicate a date and/or a time that a particular data value is generated (also referred to as a timestamp), type indicates a type of the IOT communication device 200 and/or type of data value that is generated, id is an identifier of the IOT communication device 200, and data is the data value generated by the IOT communication device 200 (e.g., current temperature, pressure, etc.). The date field may thus include a time-value such as a time, a date, a timestamp, and/or a sequence number. As used herein, generating a data value may include generating the data value internally in the IOT communication device 200 (e.g., using sensor 207 or receiving the data value from a source outside the IOT communication device 207.

Operation 1. A data value can be transmitted (also referred to as distributed) to the cloud based storage system 100 in hidden form as indicated below:
hidden datum=(date,
nonce,
$E_{Public}$(date|type),
$E_{Public}$(date|id),
$E_{Public}$(date|nonce|data|padding)

Here, nonce is a random value and $E_k(x)$ represents encryption of x using key k. The symbol "|" refers to a concatenation operation such that one information field is concatenated with another. More generally, different information fields (e.g., date and type, date and id, etc.) may be combined, with concatenation being one embodiment of such combination. According to other embodiments, different information fields may be combined in other ways (e.g., by interleaving) as long as the IOT application communication device 300 is aware of the type of combination used by the IOT communication device 200.

As a result, the hidden datum may be essentially void of any meaning outside those who have access to the Secret key. Anyone may know the date the datum is from, but the date is likely to be known anyway, as devices would likely be communicating today's information in any communication that was intercepted.

Other information, however, may be hidden. Note that while information inside the type and identity components may be relatively guessable (e.g., today's date and a commonly appearing sensor type such as a temperature sensor), it may be helpful for potential attackers. Since the information has been encrypted with a public key that is specific to one IOT communication device, outsiders may not know what this public key is. If there are multiple data records from an IOT communication device on a given date, those records may become linkable, but again, it may tell little to outsiders (and applications could choose a suitable timestamp length other than a day.)

Operation 2. Searches can be performed by the IOT application communication device 300 using the Public key associated with the IOT communication device 200. For example, an IOT application on a user's computer or smartphone (referred to as an IOT application communication device) may look for today's sensor readings from a sensor of given IOT communication device 200, by performing a search looking for records of the following value (i.e., searching for data values with matching date, type, and id):

(date, *, $E_{Public}$(date|type), $E_{Public}$(date|id), *)

Or all records for a given date and identity:

(date, *, *, $E_{Public}$(date|id), *)

Here, "*" denotes "match any value for this field" in the same structure as used for the hidden datum in operation 1. The cloud based storage system 100 can perform these searches with the actual patterns, without being given the cleartext information.

Operation 3. The IOT application communication device 300 may receive the datum values (e.g., $datum_1$, $datum_2$, etc.) in an encrypted form (i.e., in the form shown with respect to Operation 1) from the cloud based storage system 100.

Operation 4. Having received the datum values that match a query at the IOT application communication device 300, the IOT application communication device 300 can proceed to decrypt the data by: retrieving the unencrypted date and the unencrypted nonce from the record; decrypting the encrypted fields using the Secret key associated with the public key; and using the date and nonce to extract the data (referred to as a data value) from the unencrypted string "date/nonce/data/padding." Extracting the data may be performed based on the IOT application communication device 300 having knowledge of the positions/lengths of the date, nonce, data value, and padding in the unencrypted string and/or a format of the combination/concatenation of the date, nonce, data value, and padding. Lengths and actual values of the date and nonce may be known because one or both of these values may be included in the hidden datum without encryption. According to some other embodiments, a format (e.g., length/position) of the data and/or nonce may be known by the IOT application communication device 300 so that extraction does not rely on reception of these values. Similarly, a format (e.g., length and/or position) of the padding may be known by the IOT application device, or a length/format of the padding may be included in the hidden datum.

According to some embodiments of inventive concepts, data can thus be securely stored in a remote storage system 100 that is not controlled by the data owner. This data can be hidden in a way that the remote storage system 100 may be unable to decipher the data, yet some basic forms of searches can be performed on the data. Privacy and/or security may thus be improved/maintained.

According to some embodiments of inventive concepts, data may be stored in a structured manner in a cloud based storage system 100 such that there is provided: a searchable date field; a searchable but encrypted (also referred to as obfuscated) type (e.g., sensor or data type) field; a searchable but encrypted sensor identity field; and the actual data (also encrypted) associated with an IOT data value. According to some additional embodiments, the above structured but encrypted/obfuscated data may be used to conducted searches in a cloud based storage system. According to some further embodiments, the actual data may be recovered and used in a user's IOT application device, based on the results of a search.

Operations of IOT communication device 200 (also referred to as communication device 200) will now be discussed with reference to the flow chart of FIG. 4. For example, modules may be stored in memory 205 of FIG. 2, and these modules may provide instructions so that when the instructions of a module are executed by processor 203, processor 203 performs respective operations of the flow chart of FIG. 4.

At block 401, processor 203 may provide a data value and information related to the data value (e.g., using a data value provision module), where the information related to the data value includes an identifier associated with the communication device 200 and a time-value associated with the data value. The time-value, for example, may define at least one of a date, a time, an hour, and/or a sequence number.

Providing the data value may include providing the data value based on a result of a measurement performed using sensor 207. As discussed above, sensor 207 may be internal to communication device 200 or external. Moreover, while the data value may be based on a result of a measurement performed using sensor 207, the data value may be any information to be stored in the remote storage system 100. The data value, for example, may be a status (e.g., on, off, etc.), a setting (e.g., a thermostat setting, an alarm setting, etc.), etc.

At block 403, processor 203 may encrypt a combination of the time-value and the identifier using a public key to provide a first encrypted value (e.g., using an identifier encryption module). The combination of the time-value and the identifier, for example may be a concatenation of the time-value and the identifier, or an interleaving of the time-value and the identifier.

At block 405, processor 203 may encrypt the data value using the public key to provide a second encrypted value (e.g., using a data value encryption module). At block 407, processor may generate hidden datum package including the time-value, the first encrypted value, and the second encrypted value (e.g., using a hidden datum package generation module). Moreover, the hidden datum package may include the time-value without encryption. At block 409, processor 203 may transmit the hidden datum package including the time-value, the first encrypted value, and the second encrypted value through communication interface 201 to the remote storage system 100.

According to some embodiments, the information related to the data value at block 401 may further include a type value defining a type of the communication device and/or a type of the data value. In such embodiments, encrypting at block 403 may further include encrypting a combination of the time-value and the type using the public key to provide a third encrypted value, and the hidden datum package of block 407 may further include the third encrypted value. The combination of the time-value and the type, for example, may be a concatenation of the time-value and type or an interleaving of the time-value and the type.

According to some embodiments, encrypting the data value at block 403 may include encrypting a combination of the time-value and the data value to provide the second encrypted value. According to some other embodiments, the information related to the data value at block 401 may further include a random nonce value associated with the data value, and encrypting the data value at block 405 may include encrypting a combination of the random nonce value and the data value to provide the second encrypted value. According to still other embodiments, the information related to the data value at block 401 may further include a random nonce value associated with the data value, and encrypting the data value at block 405 may include encrypting a combination of the time-value, the random nonce value, and the data value to provide the second encrypted value. According to yet other embodiments, the information related to the data value at block 401 may further include a random nonce value associated with the data value, and encrypting the data value at block 405 may include encrypting a combination of the time-value, the random nonce value, the data value, and padding bits to provide the second encrypted value. In any of the embodiments combining a random nonce value and the data value, the hidden datum package may include the random nonce value without encryption. Any of the combinations discussed above may, for example, be a concatenation of the respective elements or an interleaving of the respective elements.

Operations of IOT application communication device 300 will now be discussed with reference to the flow chart of FIG. 5. For example, modules may be stored in memory 305 of FIG. 3, and these modules may provide instructions so that when the instructions of a module are executed by processor 303, processor 303 performs respective operations of the flow chart of FIG. 4.

At block 501, processor 303 may provide information to be used for the search, where the information to be used for the search includes a time-value and an identifier associated with the remote communication device (e.g., using an information provision module). The time-value, for example, may define at least one of a date, a time, an hour, and/or a sequence number. Moreover, processor 303 may provide the information to be used for the search based on user input accepted through user interface 307 of communication device 300.

At block 503, processor 303 may encrypt a combination of the time-value and the identifier using a public key associated with the remote communication device to provide an encrypted search value (e.g., using an encryption module). The combination of the time-value and the identifier, for example, may be a concatenation of the time-value and the identifier, or an interleaving of the time-value and the identifier. At block 505, processor 303 may generate a search package including the time-value and the encrypted search value (e.g., using a search package generation module). At block 507, processor 303 may transmit the search package including the time-value without encryption and the encrypted search value through communication interface 301 to the remote storage system (e.g., using a transmission module).

At block 509, processor 303 may receive a result package including a hidden datum package, where the hidden datum package includes the time-value, the encrypted search value, and an encrypted result value (e.g., using a reception module). At block 511, processor 303 may decrypt the encrypted result value using a secret key associated with the public key to provide a data value (e.g., using a decryption module). At block 513, processor 303 may extract the data value (e.g., using an extraction module). While one hidden datum package is discussed by way of example with respect to block 509, the result package may include a plurality of hidden datum packages matching the time-value and encrypted search value of the search package, but with each hidden datum package of the result package including a different encrypted result value. With a plurality of hidden datum packages, the respective encrypted result values may be decrypted using the secret key at block 511, and the respective data values may be extracted at block 513.

According to some embodiments at block 503, processor 303 may encrypt the combination of the time-value and the identifier using the public key to provide a first encrypted search value. Moreover, the information related to the data value may further includes a type value defining a type of the remote communication device 200 and/or a type of the data value, and encrypting at block 503 may further include encrypting a combination of the time-value and the type using the public key to provide a second encrypted search value. In such embodiments, the search package at block 505 may include the time-value without encryption, the first encrypted search value, and the second encrypted search value. Moreover, the hidden datum package at block 509 may include the time-value without encryption, the first encrypted search value, the second encrypted search value, and the encrypted result value. Any of the combinations discussed above may, for example, be a concatenation of the respective elements or an interleaving of the respective elements.

According to some embodiments, decrypting at block 511 may include decrypting the encrypted result value to provide a combination of the time-value and the data value, and extracting the data value at block 513 may include extracting the data value from the combination of the time-value and the data value. According to some other embodiments, the hidden datum package at block 509 may further include a random nonce value, decrypting at block 511 may include decrypting the encrypted result value to provide a combination of the random nonce value and the data value, and extracting the data value at block 513 may include extracting the data value from the combination of the random nonce value and the data value. According to still other embodiments, the hidden datum package at block 509 may further include a random nonce value, decrypting at block 511 may include decrypting the encrypted result value to provide a combination of the time-value, the random nonce value, and the data value, and extracting the data value at block 513 may include extracting the data value from the combination of the time-value, the random nonce value, and the data value. According to yet other embodiments, the hidden datum package at block 509 may further include a random nonce value, decrypting at block 511 may include decrypting the encrypted result value to provide a combination of the time-value, the random nonce value, the data value, and padding bits, and extracting the data value at block 515 may include extracting the data value from the combination of the time-value, the random nonce value, the data value, and the padding bits. In any of the embodiments where a random nonce value and the data value are combined, the hidden datum package may include the random nonce value without encryption. Any of the combinations discussed above may, for example, be a concatenation of the respective elements or an interleaving of the respective elements.

According to some embodiments, the search package of blocks 505 and 506 may include the time-value without encryption, the hidden datum package of block 509 may include the time-value without encryption, and extracting at block 513 may include extracting the data value using the time-value.

Figure 6:
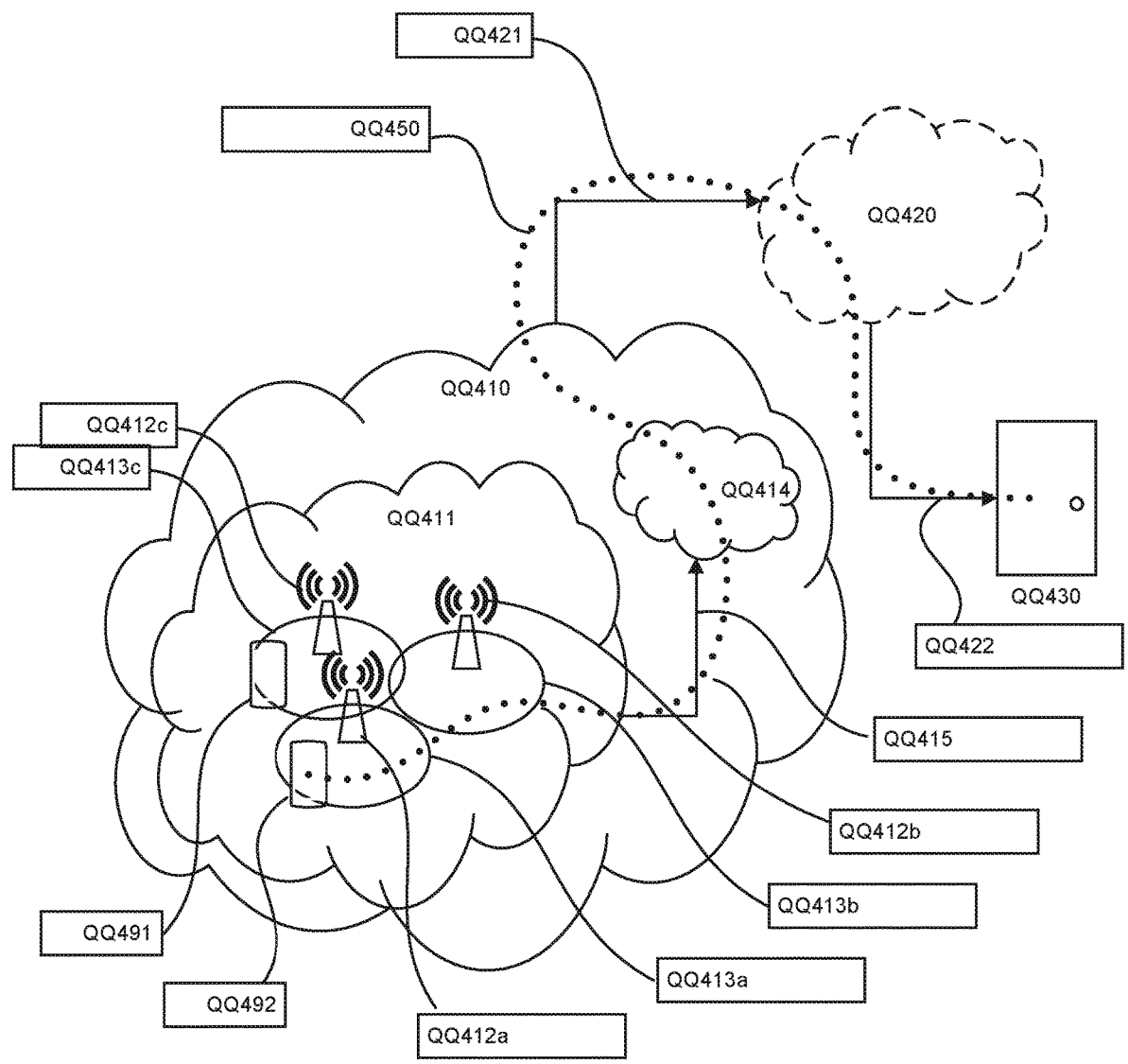
FIG. 6 is a schematic diagram illustrating a telecommunication network connected via an intermediate network to a host computer in accordance with some embodiments.

With reference to FIG. 6, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first communication device (e.g., IOT communication device, IOT application communication device, user equipment UE device, etc.) QQ491 located in coverage area QQ413c is configured to wirelessly connect to, or be paged by, the corresponding base station QQ412c. A second communication device QQ492 in coverage area QQ413a is wirelessly connectable to the corresponding base station QQ412a. While a plurality of communication devices QQ491, QQ492 are illustrated in this example, the disclosed embodiments are equally applicable to a situation where a sole communication device is in the coverage area or where a sole communication device is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 6 as a whole enables connectivity between the connected communication devices QQ491, QQ492 and host computer QQ430. The connectivity may be described as an over-the-top (OTT) connection QQ450. Host computer QQ430 and the connected communication devices QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected communication device QQ491. Similarly, base station QQ412 need not be aware of the future routing of an outgoing uplink communication originating from the communication device QQ491 towards the host computer QQ430.

Example implementations, in accordance with an embodiment, of the communication device, base station and host computer discussed in the preceding paragraphs will now be described with reference to FIG. 7. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as communication device QQ530 connecting via OTT connection QQ550 terminating at communication device QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with communication device QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with communication device QQ530 located in a coverage area (not shown in FIG. 7) served by base station QQ520. Communication interface QQ526 may be configured to facilitate connection QQ560 to host computer QQ510. Connection QQ560 may be direct or it may pass through a core network (not shown in FIG. 7) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes communication device QQ530 already referred to. Its hardware QQ535 may include radio interface QQ537 configured to set up and maintain wireless connection QQ570 with a base station serving a coverage area in which communication device QQ530 is currently located. Hardware QQ535 of communication device QQ530 further includes processing circuitry QQ538, which may comprise one or more programmable processors, application-specific integrated circuits, field programmable gate arrays or combinations of these (not shown) adapted to execute instructions. Communication device QQ530 further comprises software QQ531, which is stored in or accessible by communication device QQ530 and executable by processing circuitry QQ538. Software QQ531 includes client application QQ532. Client application QQ532 may be operable to provide a service to a human or non-human user via communication device QQ530, with the support of host computer QQ510. In host computer QQ510, an executing host application QQ512 may communicate with the executing client application QQ532 via OTT connection QQ550 terminating at communication device QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 7:
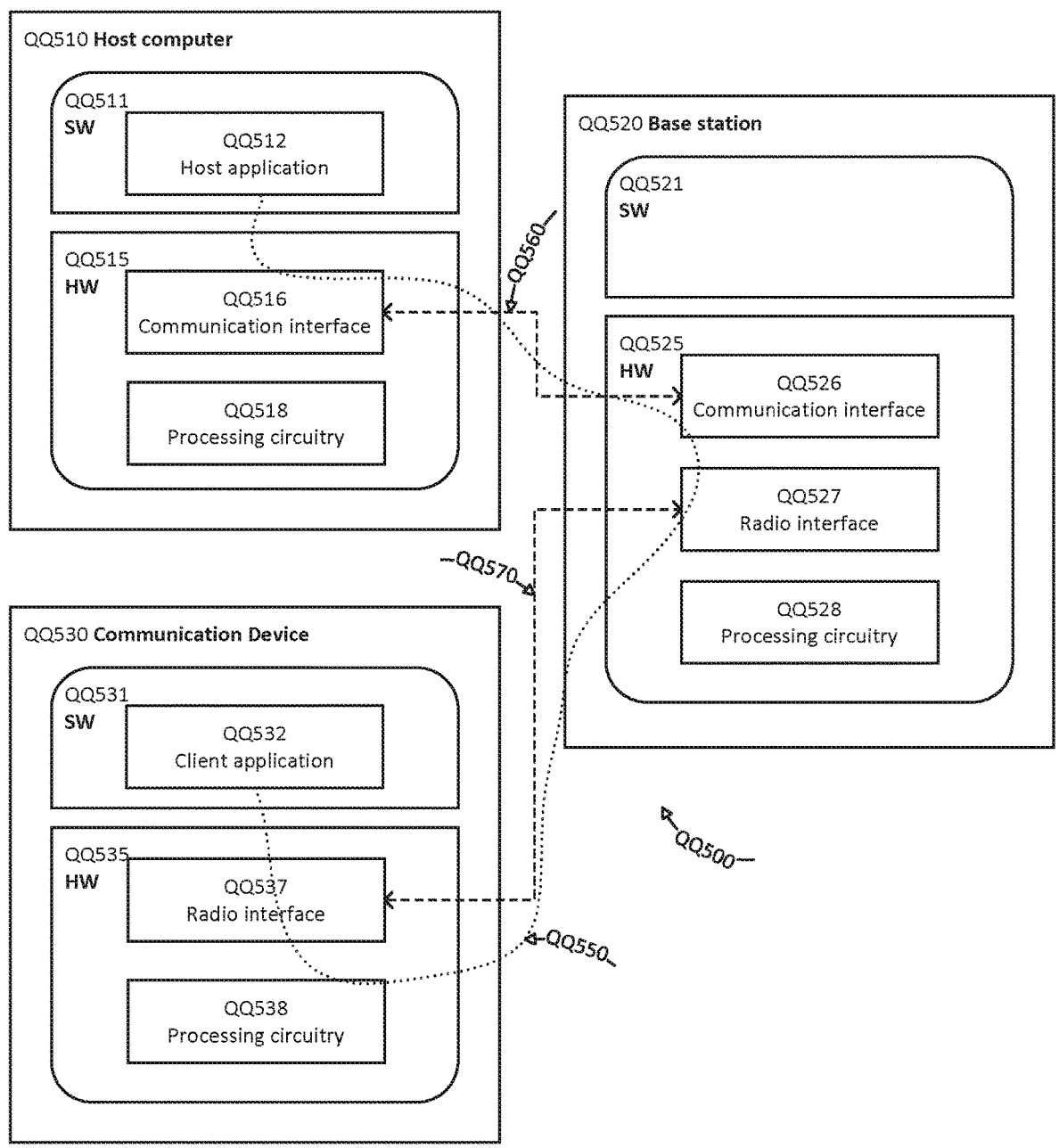
FIG. 7 is a block diagram illustrating a host computer communicating via a base station with a user equipment over a partially wireless connection in accordance with some embodiments.

It is noted that host computer QQ510, base station QQ520 and communication device QQ530 illustrated in FIG. 7 may be similar or identical to host computer QQ430, one of base stations QQ412a, QQ412b, QQ412c and one of communication devices QQ491, QQ492 of FIG. 6, respectively. This is to say, the inner workings of these entities may be as shown in FIG. 7 and independently, the surrounding network topology may be that of FIG. 6.

In FIG. 7, OTT connection QQ550 has been drawn abstractly to illustrate the communication between host computer QQ510 and communication device QQ530 via base station QQ520, without explicit reference to any intermediary devices and the precise routing of messages via these devices. Network infrastructure may determine the routing, which it may be configured to hide from communication device QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between communication device QQ530 and base station QQ520 is in accordance with the teachings of the embodiments described throughout this disclosure. One or more of the various embodiments improve the performance of OTT services provided to communication device QQ530 using OTT connection QQ550, in which wireless connection QQ570 forms the last segment. More precisely, the teachings of these embodiments may provide redundancy for uplink/downlink communications through the wireless communication network and thereby provide benefits such as improved reliability.

A measurement procedure may be provided for the purpose of monitoring data rate, latency and other factors on which the one or more embodiments improve. There may further be an optional network functionality for reconfiguring OTT connection QQ550 between host computer QQ510 and communication device QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of communication device QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary communication device signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 8:
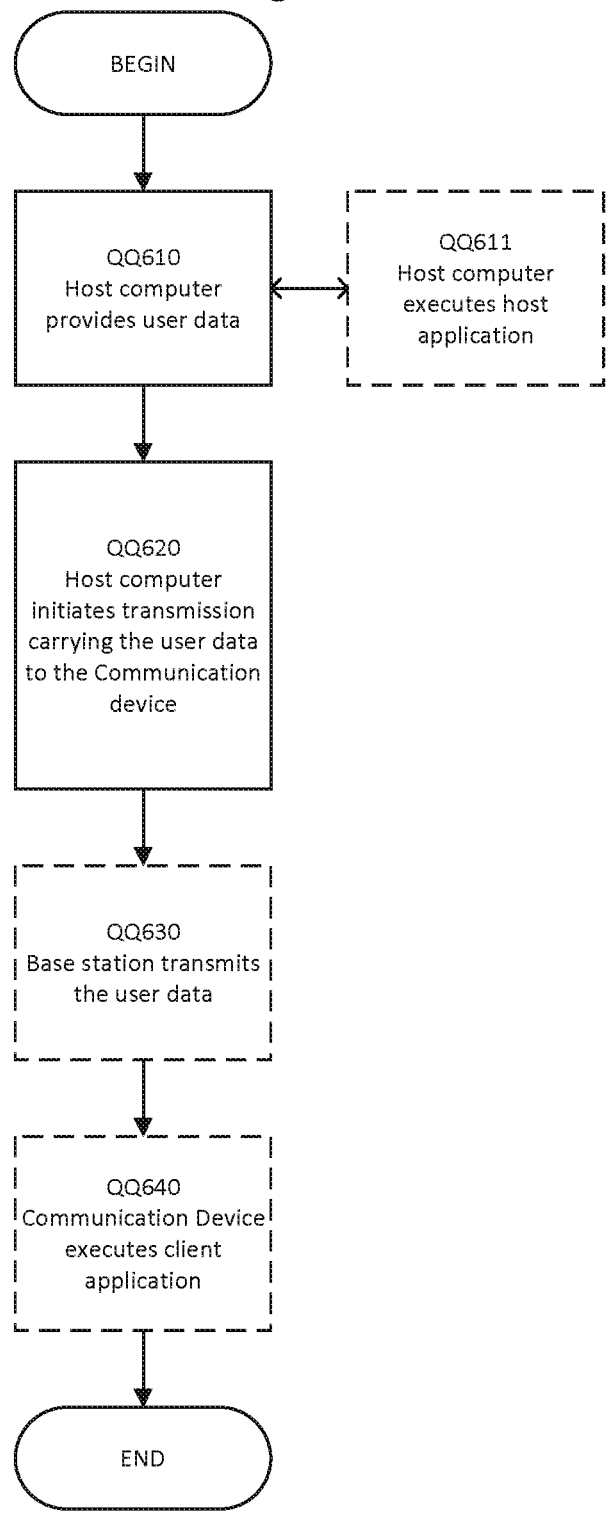
FIG. 8 is a flow chart illustrating methods implemented in a communication system including a host computer, a base station and a user equipment in accordance with some embodiments.

FIG. 8 is a flowchart illustrating a method implemented in a communication system, in accordance with one embodiment. The communication system includes a host computer, a base station and a communication device which may be those described with reference to FIGS. 6 and 7. For simplicity of the present disclosure, only drawing references to FIG. 8 will be included in this section. In step QQ610, the host computer provides user data. In substep QQ611 (which may be optional) of step QQ610, the host computer provides the user data by executing a host application. In step QQ620, the host computer initiates a transmission carrying the user data to the communication device. In step QQ630 (which may be optional), the base station transmits to the communication device the user data which was carried in the transmission that the host computer initiated, in accordance with the teachings of the embodiments described throughout this disclosure. In step QQ640 (which may also be optional), the communication device executes a client application associated with the host application executed by the host computer.

Figure 9:
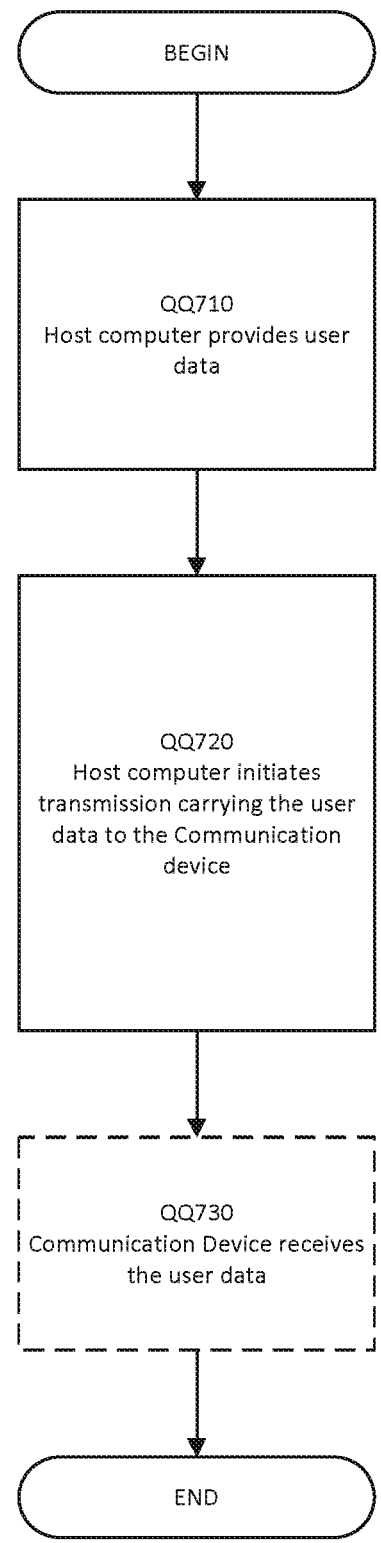
FIG. 9 is a flow chart illustrating methods implemented in a communication system including a host computer, a base station and a user equipment in accordance with some embodiments.

FIG. 9 is a flowchart illustrating a method implemented in a communication system, in accordance with one embodiment. The communication system includes a host computer, a base station and a communication device which may be those described with reference to FIGS. 6 and 7. For simplicity of the present disclosure, only drawing references to FIG. 9 will be included in this section. In step QQ710 of the method, the host computer provides user data. In an optional substep (not shown) the host computer provides the user data by executing a host application. In step QQ720, the host computer initiates a transmission carrying the user data to the communication device. The transmission may pass via the base station, in accordance with the teachings of the embodiments described throughout this disclosure. In step QQ730 (which may be optional), the communication device receives the user data carried in the transmission.

Figure 10:
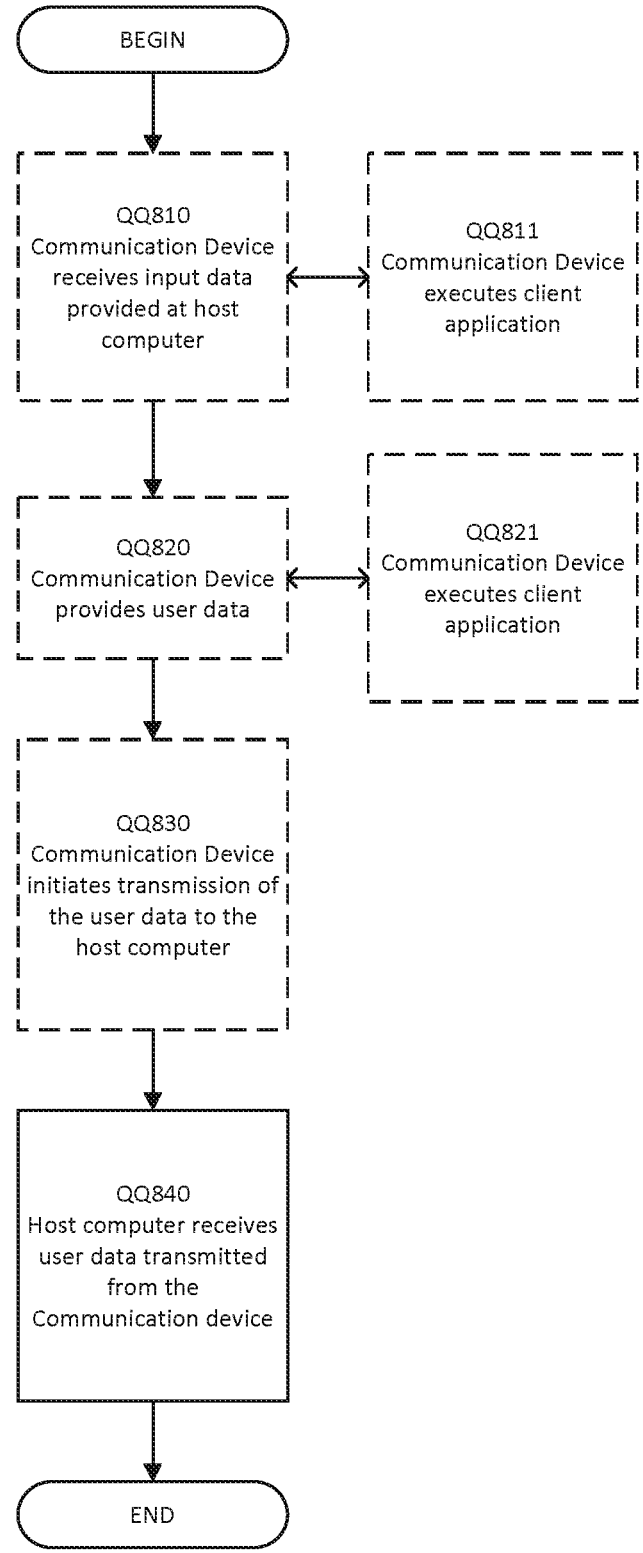
FIG. 10 is a flow chart illustrating methods implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a communication device which may be those described with reference to FIGS. 6 and 7. For simplicity of the present disclosure, only drawing references to FIG. 10 will be included in this section. In step QQ810 (which may be optional), the communication device receives input data provided by the host computer. Additionally or alternatively, in step QQ820, the communication device provides user data. In substep QQ821 (which may be optional) of step QQ820, the communication device provides the user data by executing a client application. In substep QQ811 (which may be optional) of step QQ810, the communication device executes a client application which provides the user data in reaction to the received input data provided by the host computer. In providing the user data, the executed client application may further consider user input received from the user. Regardless of the specific manner in which the user data was provided, the communication device initiates, in substep QQ830 (which may be optional), transmission of the user data to the host computer. In step QQ840 of the method, the host computer receives the user data transmitted from the communication device, in accordance with the teachings of the embodiments described throughout this disclosure.

Figure 11:
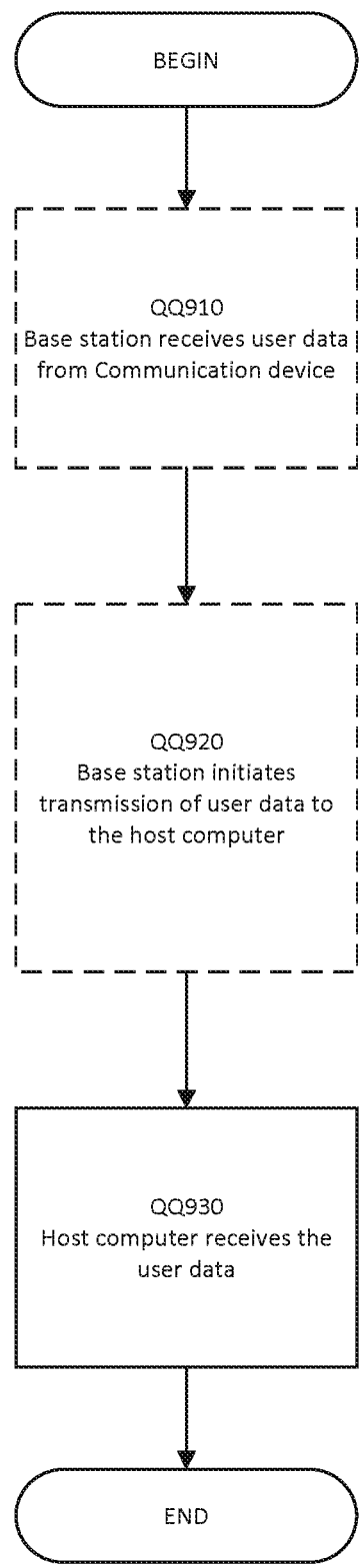
FIG. 11 is a flow chart illustrating methods implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a communication device which may be those described with reference to FIGS. 6 and 7. For simplicity of the present disclosure, only drawing references to FIG. 11 will be included in this section. In step QQ910 (which may be optional), in accordance with the teachings of the embodiments described throughout this disclosure, the base station receives user data from the communication device. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure. Each of the communication devices discussed above with respect to FIGS. 6-11, for example, may be a 3GPP user equipment UE device for IOT operation.

Some example embodiments are discussed below.

1. A communication system including a host computer comprising:

a communication interface configured to receive user data originating from a transmission from a communication device to a wireless communication node, wherein the communication device comprises a radio interface and processing circuitry configured to:

provide a data value and information related to the data value, wherein the information related to the data value includes an identifier associated with the communication device and a time-value associated with the data value;

encrypt a combination of the time-value and the identifier using a public key to provide a first encrypted value;

encrypt the data value using the public key to provide a second encrypted value;

generate a hidden datum package including the time-value, the first encrypted value, and the second encrypted value; and transmit the hidden datum package including the time-value, the first encrypted value, and the second encrypted value through the wireless communication node to the host computer.

2. The communication system of Embodiment 1 wherein the host computer comprises a remote storage system (100).

3. A communication system including a host computer comprising:

a communication interface configured to receive user data originating from a transmission from a communication device to a wireless communication node and to transmit data through the wireless communication node to the communication device, wherein the communication device comprises a radio interface and processing circuitry configured to:

provide information to be used for a search, wherein the information to be used for the search includes a time-value and an identifier associated with a remote communication device;

encrypt a combination of the time-value and the identifier using a public key associated with the remote communication device to provide an encrypted search value;

generate a search package including the time-value and the encrypted search value;

transmit the search package including the time-value without encryption and the encrypted search value through the wireless communication node to the host computer;

receive a result package including a hidden datum package from the host computer through the wireless communication node to the host computer, wherein the hidden datum package includes the time-value, the encrypted search value, and an encrypted result value;

decrypt the encrypted result value using a secret key associated with the public key to provide a data value; and extract the data value.

4. The communication system of Embodiment 3 wherein the host computer comprises a remote storage system (100).

Explanations for some abbreviations and acronyms used herein are provided below.

| Abbreviation | Explanation |
| --- | --- |
| CoAP | Constrained Application Protocol |
| HTTP | Hyper Text Transfer Protocol |
| IoT | Internet of Things |
| TLS | Transport Layer Security |
| DTLS | Datagram Transport Layer Security |

Various references mentioned herein are identified below.

Reference [1] Homomorphic encryption, https://en.wikipedia.org/wild/Homomorphic_encryption Reference [2] Attribute-based encryption, https://en.wikipedia.org/wild/Attribute-based_encryption Reference [3] A good StackExchange explanation of attribute-based encryption, https://crypto.stackexchange.com/questions/17893/what-is-attribute-based-encryption Reference [4] The original paper defining attribute-based encryption, https://eprint.iacr.org/2004/086.pdf Further definitions are provided below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of transmitting encrypted data from a communication device to a remote storage system, the method comprising:
providing a data value and information related to the data value, wherein the information related to the data value includes an identifier associated with the communication device and a time-value associated with the data value;
encrypting a combination of the time-value and the identifier using a public key to provide a first encrypted value;
encrypting the data value using the public key to provide a second encrypted value;
generating a hidden datum package including the time-value, the first encrypted value, and the second encrypted value; and
transmitting the hidden datum package including the time-value, the first encrypted value, and the second encrypted value to the remote storage system.

2. The method of claim 1, wherein the information related to the data value further includes a type value defining a type of the communication device and/or a type of the data value, wherein encrypting further comprises encrypting a combination of the time-value and the type using the public key to provide a third encrypted value, and wherein the hidden datum package further includes the third encrypted value.

3. The method of claim 1, wherein encrypting the data value comprises encrypting a combination of the time-value and the data value to provide the second encrypted value.

4. The method of claim 1, wherein the information related to the data value further includes a random nonce value associated with the data value, and wherein encrypting the data value comprises encrypting one of:
 a combination of the random nonce value and the data value,
 a combination of the time-value, the random nonce value, and the data value, and
 a combination of the time-value, the random nonce value, the data value, and padding bits, to provide the second encrypted value.

5. A method of searching encrypted data on a remote storage system, wherein the encrypted data is associated with a remote communication device, the method comprising:
 providing information to be used for the search, wherein the information to be used for the search includes a time-value and an identifier associated with the remote communication device;
 encrypting a combination of the time-value and the identifier using a public key associated with the remote communication device to provide an encrypted search value;
 generating a search package including the time-value and the encrypted search value;
 transmitting the search package including the time-value without encryption and the encrypted search value to the remote storage system;
 receiving a result package including a hidden datum package, wherein the hidden datum package includes the time-value, the encrypted search value, and an encrypted result value;
 decrypting the encrypted result value using a secret key associated with the public key to provide a data value; and
 extracting the data value.

6. The method of claim 5, wherein the encrypted search value is a first encrypted search value, wherein the information related to the data value further includes a type value defining a type of the remote communication device and/or a type of the data value, wherein encrypting further comprises encrypting a combination of the time-value and the type using the public key to provide a second encrypted search value, wherein the search package includes the time-value without encryption, the first encrypted search value, and the second encrypted search value, and wherein the hidden datum package includes the time-value without encryption, the first encrypted search value, the second encrypted search value, and the encrypted result value.

7. The method of claim 5, wherein decrypting comprises decrypting the encrypted result value to provide a combination of the time-value and the data value, and wherein extracting the data value comprises extracting the data value from the combination of the time-value and the data value.

8. The method of claim 5, wherein the hidden datum package further includes a random nonce value, wherein decrypting comprises decrypting the encrypted result value to provide one of:
 a combination of the random nonce value and the data value, and wherein extracting the data value comprises extracting the data value from the combination of the random nonce value and the data value,
 a combination of the time-value, the random nonce value, and the data value, and wherein extracting the data value comprises extracting the data value from the combination of the time-value, the random nonce value, and the data value, and
 a combination of the time-value, the random nonce value, the data value, and padding bits, and wherein extracting the data value comprises extracting the data value from the combination of the time-value, the random nonce value, the data value, and the padding bits.

9. The method of claim 5, wherein the search package includes the time-value without encryption, wherein the hidden datum package includes the time-value without encryption, and wherein extracting comprises extracting the data value using the time-value.

10. The method of claim 5, wherein providing the information to be used for the search comprises providing the information to be used for the search based on user input accepted through a user interface of the communication device.

11. A communication device comprising:
 a communication interface configured to provide communication over a network with a remote storage system; and
 a processor coupled with the communication interface, wherein the processor is configured to,
  provide a data value and information related to the data value, wherein the information related to the data value includes an identifier associated with the communication device and a time-value associated with the data value,
  encrypt a combination of the time-value and the identifier associated with the communication device using a public key to provide a first encrypted value,
  encrypt the data value using the public key to provide a second encrypted value,
  generate a hidden datum package including the time-value, the first encrypted value, and the second encrypted value, and
  transmit the hidden datum package including the time-value, the first encrypted value, and the second encrypted value through the communication interface to the remote storage system.

12. The communication device of claim 11, wherein the information related to the data value further includes a type value defining a type of the communication device and/or a type of the data value, wherein encrypting further comprises encrypting a combination of the time-value and the type using the public key to provide a third encrypted value, and wherein the hidden datum package further includes the third encrypted value.

13. The communication device of claim 11, wherein encrypting the data value comprises encrypting a combination of the time-value and the data value to provide the second encrypted value.

14. The communication device of claim 11, wherein the information related to the data value further includes a random nonce value associated with the data value, and wherein encrypting the data value comprises encrypting one of:
- a combination of the random nonce value and the data value,
- a combination of the time-value, the random nonce value, and the data value, and a combination of the time-value, the random nonce value, the data value, and padding bits to provide the second encrypted value.

15. A communication device comprising:
- a communication interface configured to provide communication over a network with a remote storage system; and
- a processor coupled with the communication interface, wherein the processor is configured to,
  - provide information to be used for a search, wherein the information to be used for the search includes a time-value and an identifier associated with a remote communication device,
  - encrypt a combination of the time-value and the identifier associated with the remote communication device using a public key associated with the remote communication device to provide an encrypted search value,
  - generate a search package including the time-value and the encrypted search value;
  - transmit the search package including the time-value without encryption and the encrypted search value through the communication interface to the remote storage system,
  - receive a result package including a hidden datum package including the time-value, the encrypted search value, and an encrypted result value, wherein the result package is received from the remote storage system through the communication interface,
  - decrypt the encrypted result value using a secret key associated with the public key to provide a data value, and
  - extract the data value.

16. The communication device of claim 15, wherein the encrypted search value is a first encrypted search value, wherein the information related to the data value further includes a type value defining a type of the remote communication device and/or a type of the data value, wherein encrypting further comprises encrypting a combination of the time-value and the type using the public key to provide a second encrypted search value, wherein the search package includes the time-value without encryption, the first encrypted search value, and the second encrypted search value; and wherein the hidden datum package includes the time-value without encryption, the first encrypted search value, the second encrypted search value, and the encrypted result value.

17. The communication device of claim 15, wherein decrypting comprises decrypting the encrypted result value to provide a combination of the time-value and the data value, and wherein extracting the data value comprises extracting the data value from the combination of the time-value and the data value.

18. The communication device of claim 15, wherein the hidden datum package further includes a random nonce value, wherein decrypting comprises decrypting the encrypted result value to provide one of:
- a combination of the random nonce value and the data value, and wherein extracting the data value comprises extracting the data value from the combination of the random nonce value and the data value,
- a combination of the time-value, the random nonce value, and the data value, and wherein extracting the data value comprises extracting the data value from the combination of the time-value, the random nonce value, and the data value, or
- a combination of the time-value, the random nonce value, the data value, and padding bits, and wherein extracting the data value comprises extracting the data value from the combination of the time-value, the random nonce value, the data value, and the padding bits.

19. The communication device of claim 15, wherein the search package includes the time-value without encryption, wherein the hidden datum package includes the time-value without encryption, and wherein extracting comprises extracting the data value using the time-value.

20. The communication device of claim 15 further comprising:
- a user interface coupled with the processor, wherein the user interface is configured to accept user input and wherein providing the information to be used for the search comprises providing the information to be used for the search based on the user input accepted through the user interface.

* * * * *